United States Patent [19]
Bennett

[11] 3,961,904
[45] *June 8, 1976

[54] CRYSTALLIZATION APPARATUS

[75] Inventor: Richard C. Bennett, Park Forest, Ill.

[73] Assignee: Whiting Corporation, Harvey, Ill.

[ * ] Notice: The portion of the term of this patent subsequent to Mar. 25, 1992, has been disclaimed.

[22] Filed: Mar. 24, 1975

[21] Appl. No.: 561,256

Related U.S. Application Data

[63] Continuation-in-part of Ser. No. 246,439, April 21, 1972, Pat. No. 3,873,275, which is a continuation of Ser. No. 861,805, Sept. 29, 1969, abandoned.

[52] U.S. Cl. ........................... 23/273 R; 23/301 R
[51] Int. Cl.² ........................................ B01D 9/02
[58] Field of Search .................... 23/273 R, 301 R

[56] References Cited
UNITED STATES PATENTS

| | | | |
|---|---|---|---|
| 1,191,108 | 7/1916 | Kestner | 23/273 R |
| 1,945,281 | 1/1934 | Leithauser | 23/273 R |
| 2,387,818 | 10/1945 | Wethly | 23/273 R |
| 2,827,366 | 3/1958 | Saeman | 23/273 R |
| 3,071,447 | 1/1963 | Bernhardi | 23/273 R |
| 3,137,544 | 6/1964 | Ebner | 23/273 R |
| 3,292,999 | 12/1966 | Chirico | 23/273 R |
| 3,600,138 | 8/1971 | Voigt | 23/273 |
| 3,600,139 | 8/1971 | Hedrick | 23/273 R |
| 3,873,275 | 3/1975 | Bennett | 23/273 R |
| 3,883,311 | 5/1975 | Kanai | 23/273 R |

*Primary Examiner*—Wilbur L. Bascomb, Jr.
*Assistant Examiner*—S. J. Emery
*Attorney, Agent, or Firm*—Lockwood, Dewey, Zickert & Alex

[57] ABSTRACT

A crystallization vessel is provided which includes an elutriation column having an outlet at an upper end thereof and an inlet at a lower end thereof which inlet is in communication with a body of slurry contained therein. Flow regulating means associated with the elutriation column outlet enables the flow velocity within the column to be regulated for controlling the size of crystal particles removed from the slurry body through the elutriation column outlet. A movable baffle in the column is also provided for selectively varying the cross-sectional area of the column and thereby independently regulating the quantity of slurry removed from the slurry body through the elutriation column outlet. In this manner, both the size and quantity of crystal particles removed from the slurry body are independently regulated, thereby providing product crystals of improved size uniformity.

16 Claims, 6 Drawing Figures

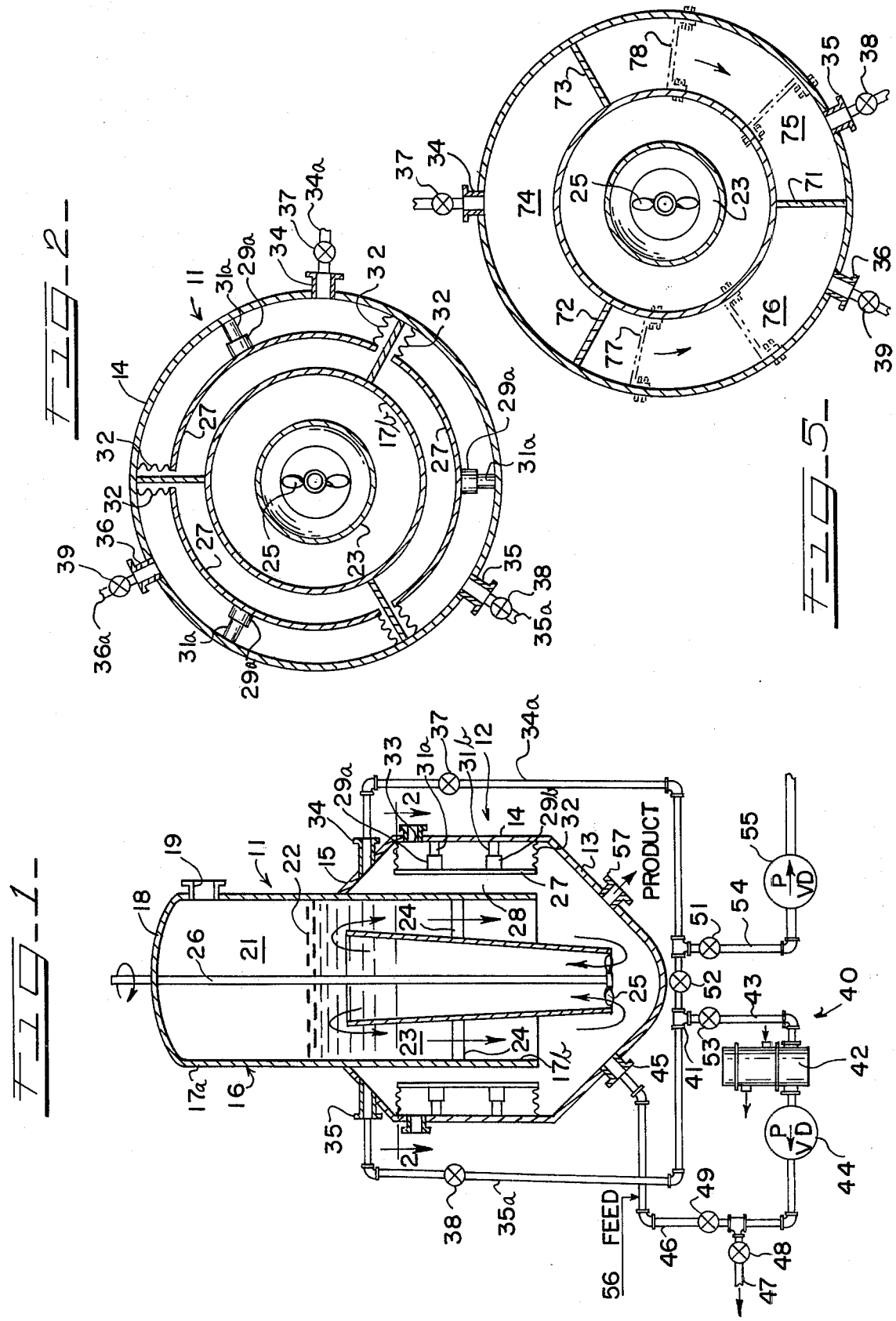

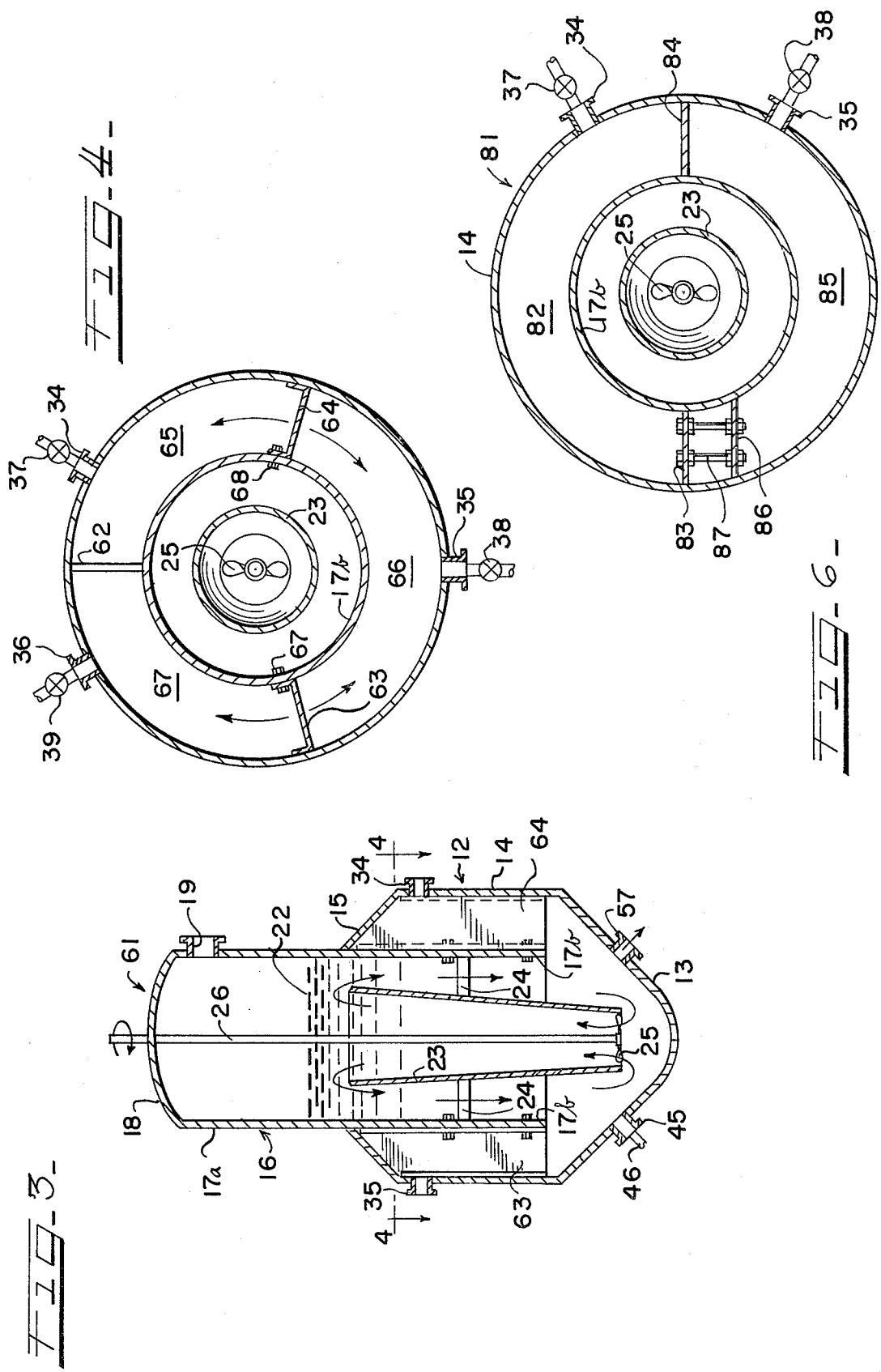

3,961,904

CRYSTALLIZATION APPARATUS

BACKGROUND AND DESCRIPTION OF THE INVENTION

This application is a continuation-in-part of my copending application Ser. No. 246,439, entitled "Crystallization Apparatus and Method", filed Apr. 21, 1972, and now U.S. Pat. No. 3,873,275, which, in turn, was a continuation of my prior application Ser. No. 861,805, filed Sept. 29, 1969 and now abandoned.

The present invention generally relates to improvements and innovations for providing improved equilibrium conditions within a crystallization vessel. More particularly, this invention is concerned with an improved crystallization apparatus and method wherein both the size and quantity of crystal fines removed from a slurry body undergoing crystallization are regulated.

Various desired objectives for improving product size and uniformity in crystallization processes are known in the art. These include: reducing the level of supersaturation to correspond to low rates of nuclei formation; maintaining adequate seed crystals both as to size and quantity upon which the deposition of the generated supersaturation may take place; contacting the seed with the supersaturated liquid as soon as possible in order to avoid losses due to time decay; minimizing mechanical stimulus and attrition which promotes unwanted nucleation; providing insofar as possible conditions of temperature, viscosity, interfacial tension, surface tension and impurities which favor the growth of the desired product; and, removing excess nuclei or fine crystals as soon as possible after their formation.

The present invention provides an improved crystallization apparatus and method by which cycling in the size distribution of product crystals is substantially avoided. In accordance with the present invention the mother liquor recirculation rate and the size of crystal particles removed through a fines destruction circuit are independently regulated so that not only are undesirable "fines" removed from the slurry body undergoing crystallization, but also, the residence time of such fines is effectively regulated. In this manner, both the size and quantity of crystal particles removed from the slurry body are selectively and independently regulated resulting in product crystals of improved size uniformity.

Crystallization vessels constructed in accordance with an important aspect of the present invention include an elutriation column having an outlet at an upper end thereof and an inlet at a lower end thereof which inlet is in communication with a body of slurry contained in the vessel. Flow regulating means associated with the elutriation column outlet enables the flow velocity within the column to be regulated for controlling the size of crystal particles removed from the slurry body through the elutriation column outlet. A movable baffle in the column is also provided for selectively varying the cross-sectional area of the column and thereby independently regulating the quantity of slurry removed from the slurry body through the elutriation column outlet.

It is, therefore, an important object of the present invention to provide a crystallization apparatus and method wherein optimum equilibrium conditions are achieved for producing a crystal product of uniform size over a given period of time.

Another object of the present invention is to provide a new and improved crystallization apparatus and method wherein the size and quantity of fine crystals removed from a slurry body through a fines removal circuit are independently regulated.

Another object of the present invention is to provide a new and improved crystallization apparatus and method in which the residence time of crystal particles below a predetermined size is effectively controlled to achieve optimum equilibrium conditions.

Another object of the present invention is to provide an improved crystallization apparatus and method wherein the size and quantity of crystal fines removed from a slurry body through an elutriation column are independently regulated with respect to each other by the provision of means for regulating the flow velocity in the column and separate means for selectively varying the cross-sectional area of that column.

These and other objects and advantages of the present invention will be apparent from the following detailed description thereof taken in conjunction with the accompanying drawings wherein the reference numerals denote like parts, in which:

FIG. 1 is a vertical sectional schematic view of a crystallization apparatus embodying the present invention;

FIG. 2 is a plan sectional view taken along the line 2—2 of FIG. 1;

FIG. 3 is a vertical sectional schematic view of a modified crystallization apparatus embodying the present invention;

FIG. 4 is a plan sectional view taken along the line 4—4 of FIG. 3;

FIG. 5 is a plan sectional view similar to FIG. 4 of another modified crystallization apparatus embodying the present invention; and, FIG. 6 is a plan sectional view similar to FIG. 4 of a further embodiment of crystallization apparatus embodying the present invention.

Referring to the drawings and with particular reference to FIGS. 1 and 2, the reference numeral 11 generally designates an improved crystallization apparatus constructed in accordance with the present invention which includes a main tank or vessel 12 having a tapered bottom section 13 which extends into a fixed diameter mid-section 14 and frusto-conical top section 15 joined to a generally cylindrical column 16. As is shown, column 16 includes an upper side wall portion 17a extending above the main vessel 12 and a lower side wall portion 17b which defines a fixed interior circumferential baffle within the main vessel 12. The upper side wall portion 17a of column 16 is terminated in a dome section 18 and is provided with a suitable vapor outlet 19 which communicates the interior freeboard space 21 above the slurry level 22 with a suitable vacuum source (not illustrated) for maintaining supersaturation conditions within the slurry body portion adjacent the slurry level 22.

In the illustrated embodiment, a draft tube 23 is suitably supported in known manner by a plurality of radially extending spokes 24 which secure the draft tube 23 to the fixed interior baffle 17b. Circulation of the slurry is provided by a propeller 25 which is fixed to a shaft 26 which, in turn, is driven by a drive means (not illustrated) such as, for example, an electric motor. The propeller serves to circulate the liquid slurry within the vessel 12 and column 16 in a predetermined flow path and is operated at a sufficient fluid velocity so as to suspend all solid particles within the slurry. In the illustrated embodiment, the predetermined flow path is in the form of a toroidal flow pattern which passes upwardly through the draft tube 23 and then downwardly along the exterior thereof.

In accordance with an important aspect of the present invention, a movable baffle 27 is provided for selectively varying the cross-sectional area of the elutriation column 28. This baffle has a substantially perpendicular longitudinal cross-section and a generally arcuate transverse cross-section which is generally concentrically oriented with respect to the fixed circumferential baffle 17b. Accordingly, baffle 27, in cooperation with the fixed interior circumferential baffle 17b, defines an elutriation column of channel 28 of substantially uniform cross-section from bottom to top. Selective variation in the cross-sectional area of this elutriation column is achieved by movement of the baffle to and away from the fixed baffle 17b. Accordingly, baffle 27 is mounted for movement along a direction of travel which is radially disposed with respect to the vertical center axis of the vessel 12. For example, in the embodiment of the invention illustrated in FIGS. 1 and 2, travel of the baffle 27 is guided by a pair of sleeve members 29a and 29b which are fixed to the back face of the movable baffle 27 and slidably mounted around guide pins 31a and 31b which, in turn, are fixed to the interior of the cylindrical side wall portion 14 of the vessel 12.

As will be apparent to those skilled in this art, various automatic and manual means can be employed for effecting movement of the baffle 27 and, accordingly, the present invention is not to be limited to any particular arrangement or system for this purpose. The system schematically depicted in the illustrated embodiment is essentially hydraulically powered and includes a flexible diaphragm 32 which surrounds the movable baffle 27 and sealingly encloses the chamber defined between the back face of baffle 27 and the interior of the side wall portion 14 adjacent thereto. In this arrangement, actuation of the movable baffle is effected hydraulically by pumping fluid into or out of the connection 33 in accordance with known hydraulic principles and practices. As such, this particular arrangement offers the advantage of enabling the operator to vary the cross-sectional area of the elutriation columns during operation of the crystallizer.

As best shown in FIG. 2, the illustrated embodiment of the present invention includes three separate but identical elutriation columns and, accordingly, like reference numerals have been used to designate like component parts thereof. If desired, however, only one of these elutriation columns need incorporate the movable baffle 27 in order to achieve the benefits of the present invention. Correspondingly, this invention is not limited to the three column arrangement shown but may include any number of elutriation columns so long as at least one of such columns is provided with means for selectively varying the cross-sectional area thereof.

In accordance with a further aspect of the present invention, each of the elutriation columns in the vessel 12 communicates with a fines removal outlet connection adjacent the upper end thereof which outlets are designated by the reference numerals 34, 35 and 36. As is shown, fines removal outlet connection 34 communicates with flow line 34a which is provided with a flow regulating valve 37 for regulating the flow of slurry liquid and fine particles removed from the fines removal outlet 34. Likewise, fines removal outlet connections 35 and 36 communicate with fines removal flow lines 35a and 36a which, respectively, are provided with flow regulating valves 38 and 39 for controlling the flow of slurry therethrough.

In the illustrated embodiment, each of the fines removal process lines 34a, 35a and 36a communicates with a single fines destruction circuit 40. As shown, for example, flow lines 34a and 35a communicate with the fines destruction circuit 40 through a tee member 41, the outlet connection of which communicates with a heat exchanger 42 through a process line 43. While not specifically shown, it will be appreciated that a similar connection can serve to interconnect flow line 36a with the heat exchanger 42. If desired, however, separate fines destruction circuits may be provided for each of the fines removal outlets 34, 35 and 36. Likewise, other solubilizing means may be used in place of, or in conjunction with, heat exchanger 42. Such other means can include, for example, suitable devices for the addition of a solvent (such as water) to the flow either in the fines destruction circuit itself or at some other suitable location in the system.

The outlet of heat exchanger 42 discharges into the suction side of a variable delivery pump 44 which returns the flow of dissolved crystal fines and liquid to the vessel inlet 45 through the flow line 46. If desired, a constant flow pump can be substituted in place of variable delivery pump 44 in which event flow velocities in the elutriation columns will be regulated by the particular flow regulating valve (i.e. valve 37, 38 or 39) associated therewith. If discharge of dissolved crystals and slurry liquid to storage or other processing through a side discharge line 47 is desired, valves 48 and 49 can be provided. In most instances, however, dissolved crystals and slurry liquid will be returned to the slurry body in the vessel 12.

The embodiment shown in FIGS. 1 and 2 also includes provision for directing the flow from the outlet connections 34, 35 and 36 to storage or further processing without necessitating the passage of such flow through the heat exchanger 42. In particular, suitable valve means 41, 52 and 53 can be provided to effect a desired flow of the slurry removed from outlet connections 34, 35 and 36 through discharge line 54 to other locations. As shown, flow line 54 is equipped with a suitable variable flow pump 55, however, a constant flow pump can be substituted in place thereof if desired.

In operation, the vessel 12 is preferably maintained at the level indicated at 22 with a slurry which includes crystal particles and liquid. Evaporation of liquid of solution is accomplished by maintaining vacuum conditions in the freeboard space 21 in order to maintain supersaturation conditions in at least a portion of the slurry body.

A closed flow circuit is created and maintained by propeller 25 which operates conjointly with draft tube 23 to direct the flow in a generally toroidal pattern as is generally depicted by the solid arrows in FIG. 1. As shown, the liquid flows upwardly through the draft tube 23 and then spreads outwardly over the top of the draft tube and then downwardly along the outside of the draft tube until it contacts the generally tapered section 13 adjacent the bottom of the vessel from which it is deflected and flows upwardly through the draft tube 23. Propeller 25 is driven at a rate which will be sufficient to suspend the largest crystals or particles but which also maintains a relatively quiescent zone adjacent the inlet to each of the elutriation columns 28. Under these conditions, the lower ends of the elutriation columns 28 are in open communication with the outer portion of the closed flow circuit. Feed slurry is then fed through a feed inlet 56 which, if desired, can be in communication with return line 46. Likewise, coarse product crystals are removed on a steady state basis through product outlets 57, positioned in the tapered bottom portion 13 of the vessel 12. Feed material is fed into the vessel at a rate which will maintain the operating level of the liquid substantially as shown at 22 and compensate for materials withdrawn through the fines removal outlets 34, 35 and 36, product outlet 57 and vapor outlet 19.

Since the lower ends of the elutriation columns 28 are on the fringe or periphery of the main flow circuit, the main flow which is created by propeller 25 does not operate to carry away any of the larger particles or crystals into these elutriation columns. Flow through these elutriation columns is controlled through the variable flow pump 44 in the fines destruction circuit or the variable flow pump 55 in the alternative discharge circuit. Correspondingly, if constant flow rate pumps are substituted in place of variable flow pumps 44 and 55, flow velocities in the elutriation columns can be controlled by the respective flow regulating valves 37, 38 and 39. The flow velocity in the elutriation columns is regulated to suspend and remove only particles of a predetermined critical size or smaller. In accordance with an important aspect of the present invention, the quantity of slurry and crystal particles below such predetermined size which are removed from the slurry body are also independently regulated. In this manner, the residence time of crystal fines in the vessel 12 is controlled so that such residence time is less than the residence time which corresponds to the size of the predetermined critical sized particles to be removed through the fines removal outlets. This additional control means is obtained through the use of the previously described movable baffle 27 which enables the operator to selectively vary the cross-sectional area of the elutriation columns. For example, if a selected flow velocity in one of the elutriation columns 28 removed a desired size crystal particle through the fines removal outlet associated therewith, that flow rate would automatically establish the quantity of such fines which would be removed through such outlet for each fixed position of the movable baffle 27. Should the operator of the crystallizer, however, desire to remove additional particles of the same size, he simply would activate the movable baffle 27 so as to increase the cross-sectional area of the elutriation column and increase the volumetric flow rate through the column so as to achieve the same upward fluid velocity therein. In this manner, he would be able to remove an increased quantity of crystal particles of the same given size. In the event that only one of the elutriation columns 28 was being used at a particular time in the operation of the unit and the operator thereof desired to remove additional crystal fines of the same size from the slurry body contained therein, this same result could be achieved by opening the valves associated with one of the additional elutriation columns and effecting the same fluid velocity therein. Accordingly, it will be appreciated that the present invention provides a means for regulating the size of crystal particles removed through the elutriation columns and a separate means for selectively regulating the volume of slurry liquid and crystal particles removed through such elutriation columns in a manner which is completely independent of the size of the crystal particles in the stream thus removed. Accordingly, both the size and quantity of crystal particles removed from the slurry body are selectively and independently regulated with respect to each other thereby enabling the apparatus and method of the present invention to provide product crystals of improved size uniformity.

Referring to FIGS. 3 and 4, a further embodiment of the present invention is shown wherein the elutriation columns cross-sectional area varying means in the form of a baffle which is circumferentially movable toward and away from a fixed baffle in the column. As shown, this embodiment of the apparatus is generally depicted by the reference numeral 61 and includes a main tank or vessel 12 having an exterior configuration generally similar to that shown and described in conjunction with the embodiment of FIGS. 1 and 2. Apparatus 61, however, incorporates a fixed radial baffle 62 and a pair of circumferentially movable radial baffles 63 and 64 which cooperate to define three separate elutriation columns or channels 65, 66 and 67 which respectively are associated with fines removal outlets 34, 35 and 36.

Each of the movable baffles 63 and 64 is provided with flange portions which respectively sealingly engage with the interior of the inner cylindrical shell 14 and the outer surface of the lower side wall portion 17b. Suitable fastening means 67 and 68 can be provided for securing the movable baffles 63 and 64 at appropriate locations which produce the desired cross-sectional area for the elutriation columns. Of course, as was the case with the embodiment shown in FIGS. 1 and 2, operation of the vessel 61 can be done with any number or combination of elutriation columns by selectively fully opening or closing the individual flow regulating valves 37, 38 and 39 associated therewith.

The embodiment of the present invention shown in FIG. 5 is generally similar to that shown in FIGS. 3 and 4 except that in the FIG. 5 embodiment three fixed radial baffles 71, 72 and 73 are provided which cooperate with interior circumferential lower side wall 17b and the fixed diameter mid-section 14 of the vessel 12 to define a plurality of elutriation columns or channels 74, 75 and 76 which respectively communicate with fines removal outlets 34, 35 and 36. The cross-sectional area of elutriation columns 75 and 76 can, in accordance with an important aspect of the present invention, be selectively varied by relocation of the movable baffles 77 and 78 as shown in phantom. For example, baffle 77 can be selectively positioned at a plurality of locations toward and away from fixed baffle 71 to selectively increase or decrease the cross-sectional area of elutriation columns 76 as desired. Similarly, baffle 78 can be selectively moved toward and away from fixed radial baffle 71 to selectively increase or decrease the cross-sectional area of elutriation column or channel 75 as desired. In the illustrated embodiment, the movable baffles 77 and 78 are retained in a fixed position during operation by appropriate fastening means. In this embodiment, therefore, an elutriation column of fixed cross-sectional area, namely, elutriation column 74, is provided and two separate elutriation columns of variable cross-sectional area, namely, elutriation columns 75 and 76, are also provided. Of course, as previously noted and as was true with the other embodiments, operation of the FIG. 5 embodiment can be done with any number or combination of these elutriation columns.

The embodiment of the present invention depicted in FIG. 6 and generally designated by the reference numeral 81 has a general configuration similar to that shown in FIG. 3 differing therefrom only in the particular elutriation column arrangement. In particular, the apparatus 81 includes an elutriation column of fixed cross-sectional area located between a pair of fixed radial baffles 82 and 84. A second elutriation column 85 is provided with means for varying the cross-sectional area thereof by the use of a movable baffle 86 which can be retained in a selected position by means of a suitable fastening means such as generally designated by the reference numeral 87. Operation of the embodiments described in FIGS. 3, 4, 5 and 6 is, of course, similar to operation of the FIG. 1 and 2 embodiments as previously described.

In all of these embodiments, a crystallization apparatus and method are provided wherein the size and quantity of crystal particles withdrawn from a circulating slurry body through elutriation columns and fines removal outlets associated therewith are independently regulated to provide product crystals of substantially improved size uniformity. As such, it is important to note that with the present invention the mother liquor recirculation rate is regulated independently of the size of the crystal particles removed from the slurry undergoing crystallization. Accordingly, not only are the undesirable crystal fines removed from the slurry but also the residence time of such fines is effectively regulated to provide heretofore unachieveable equilibrium conditions in the crystallizer.

While in the foregoing specification certain embodiments of the present invention have been described in detail, it will be appreciated that modifications and variations to such embodiments will be apparent to those skilled in the art. Accordingly, the present invention is to be limited only by the scope of the appended claims.

I claim:

1. An improved crystallization apparatus, comprising a vessel adapted to contain a body of slurry which includes crystal particles and liquid, first means for maintaining supersaturation conditions in the slurry body to induce crystallization therein, second means in said crystallization apparatus for circulating said slurry in a predetermined flow path in said vessel and for maintaining said crystal particles in suspension, third means for selectively removing a stream of slurry liquid and crystal particles which are below a predetermined size only from said slurry body and fourth means for selectively regulating the volume of slurry liquid and crystal particles in said stream independently of the size of the crystal particles in said stream, said third means including an elutriation column and flow regulating means operatively associated therewith, said elutriation column having an inlet adjacent its lower end communicating with said body of slurry adjacent the periphery of said predetermined flow path and an outlet located at least a substantial height above said inlet, said flow regulating means being operatively associated with said outlet for withdrawing slurry from said elutriation column at a rate which can be selectively controlled to establish a desired flow velocity in said elutriation column for suspending and removing from said slurry body crystal particles which are below a predetermined size only, said fourth means including means for selectively varying the cross-sectional area of said elutriation column.

2. The improved crystallization apparatus of claim 1 wherein said fourth means comprises a movable baffle located in said elutriation column.

3. The improved crystallization apparatus of claim 2 wherein said movable baffle is hydraulically actuated.

4. The improved crystallization apparatus of claim 2 wherein fastener means interconnects said movable baffle with said apparatus to selectively secure said movable baffle to any one of a plurality of locations in said elutriation column.

5. The improved crystallization apparatus of claim 2 wherein said elutriation column is defined by inner and outer walls of generally planar longitudinal cross-section and of generally concentric arcuate transverse cross-section, one of said walls comprising said movable baffle and being movable along a direction of travel which is radially disposed with respect to the common center axis of said walls for selectively regulating the cross-sectional area of said elutriation column.

6. The improved crystallization apparatus of claim 2 wherein said vessel has a mid-section defined by a generally cylindrical shell and an interior cylindrical wall coaxially disposed with respect to said cylindrical shell, said movable baffle comprising a curvate wall member having a generally planar longitudinal cross section and a generally concentric arcuate transverse cross-section with respect to the common center axis of said interior cylindrical wall, said baffle being selectively movable between said generally cylindrical shell and interior cylindrical wall along a direction of travel which is radially disposed with respect to the vertical center axis of said vessel mid-section.

7. The improved crystallization apparatus of claim 2 wherein said elutriation column is defined by inner and outer coaxially disposed walls in fixed relationship to each other between which opposed partition members are radially disposed, one of said opposed partition members comprising said movable baffle and being selectively circumferentially movable toward and away from the other of said opposed partition members for selectively regulating the cross-sectional area of said elutriation column.

8. The improved crystallization apparatus of claim 2 wherein said vessel has a mid-section defined by a generally cylindrical shell and an interior cylindrical wall coaxially disposed with respect to said cylindrical shell, a pair of opposed partition members radially disposed between said interior wall and cylindrical shell defining said elutriation column, one of said opposed partition members comprising said movable baffle, said one partition member being selectively circumferentially movable toward and away from the other of said opposed partition members for selectively regulating the cross-sectional area of said elutriation column.

9. An improved crystallization apparatus, comprising a vessel adapted to contain a body of slurry which includes crystal particles and liquid, means for maintaining supersaturation conditions in the slurry body to induce crystallization therein, means in said crystallization apparatus for circulating said slurry in a predetermined flow path in said vessel and for maintaining said crystal particles in suspension, elutriation column means in said apparatus having a substantially uniform cross-section for at least a substantial portion of its height and having an inlet communicating with said body of slurry adjacent the periphery of said predetermined flow path whereby slurry will be received in said elutriation column means from a relatively quiescent zone with respect to said predetermined flow path, means associated with said elutriation column means for withdrawing slurry therefrom at a rate which can be selectively controlled to establish a flow velocity in said elutriation column means which will suspend and remove from said slurry body only crystal particles below a predetermined size, means for selectively varying the cross-sectional area of said elutriation column means whereby both the size and quantity of crystal particles removed from said slurry body can be independently varied to provide product crystals of improved size uniformity.

10. The improved crystallization apparatus of claim 9 wherein said means for varying the cross-sectional area of said elutriation column means comprises a movable baffle.

11. The improved crystallization apparatus of claim 10 wherein said elutriation column means includes a channel defined by inner and outer walls of generally planar longitudinal cross-section and of generally concentric arcuate transverse cross-section, one of said walls comprising said movable baffle and being movable along a direction of travel which is radially disposed with respect to the common center axis of said walls for selectively regulating the cross-sectional area of said channel.

12. The improved crystallization apparatus of claim 10 wherein said elutriation column means includes a channel defined by inner and outer coaxially disposed walls in fixed relationship to each other between which opposed partition members are radially disposed, one of said opposed partition members comprising said movable baffle and being selectively circumferentially movable toward and away from the other of said opposed partition members for selectively regulating the cross-sectional area of said channel.

13. An improved crystallization apparatus, comprising a vessel adapted to contain a body of slurry which includes crystal particles and liquid, means in said vessel for maintaining a supersaturation zone in said slurry body to induce crystallization therein, means in said vessel for circulating a substantial portion of said slurry body in a predetermined flow path through said supersaturation zone and for maintaining said crystal particles in suspension in said liquid, elutriation column means which includes a channel having a substantially uniform cross-section for at least a substantial portion of its height and a lower end which is in open communication with said substantial portion of said slurry body adjacent the predetermined flow path for withdrawing a stream of liquid and crystal particles below a predetermined size only from said slurry body, means for selectively controlling the velocity of slurry in said elutriation column means, means for independently controlling the volume of liquid and crystal particles in said stream, means associated with said stream for solubilizing the crystal particles in said stream, and means for returning said stream to said vessel after the crystal particles therein have been solubilized.

14. The improved crystallization apparatus of claim 13 wherein said means for independently controlling the volume of liquid and crystal particles in said stream comprises a movable baffle located in the channel of said elutriation column means whereby the cross-sectional area of said channel can be selectively regulated.

15. The improved crystallization apparatus of claim 14 wherein said channel of elutriation column means is defined by inner and outer walls of generally planar longitudinal cross-section and of generally concentric arcuate transverse cross-section, one of said walls comprising said movable baffle and being movable along a direction of travel which is radially disposed with respect to the common center axis of said walls.

16. The improved crystallization apparatus of claim 14 wherein said channel of elutriation column means is defined by inner and outer coaxially disposed walls in fixed relationship to each other between which opposed partition members are radially disposed, one of said opposed partition means comprising said movable baffle and being selectively circumferentially movable toward and away from the other of said opposed partition members.

* * * * *